Aug. 23, 1955

W. E. DAVIS ET AL.

2,715,968

TOBACCO HARVESTER

Filed May 18, 1953

INVENTORS
WILLIAM E. DAVIS
ALTON SCOTT
OLIVER W. SCOTT

BY Norman S. Blodgett

ATTORNEY

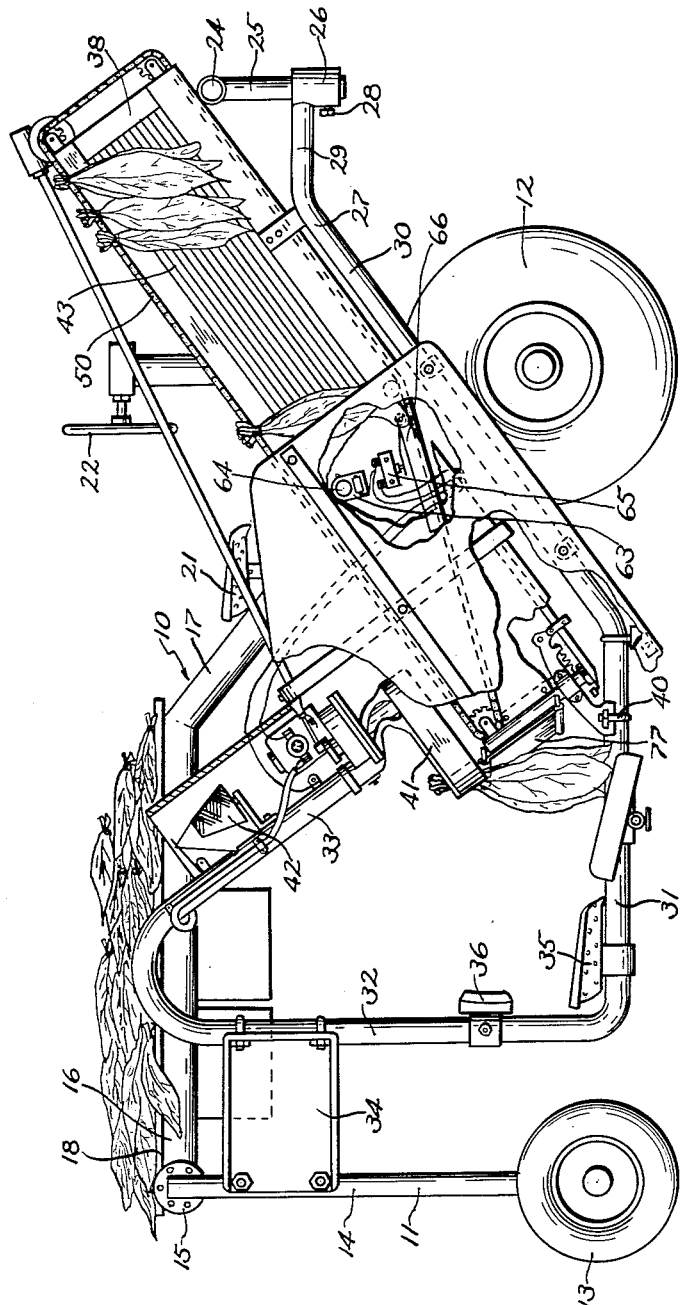

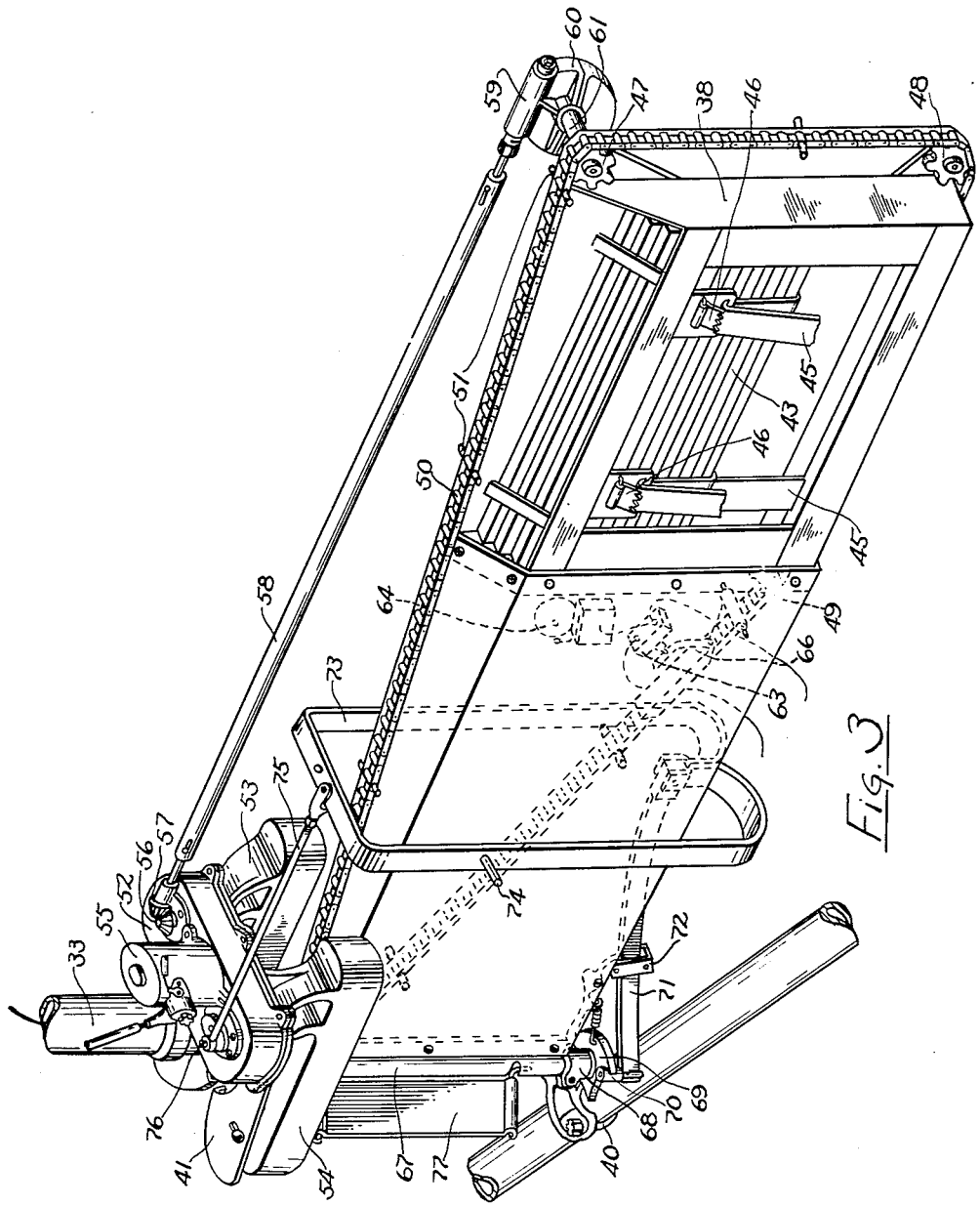

Aug. 23, 1955   W. E. DAVIS ET AL   2,715,968
TOBACCO HARVESTER
Filed May 18, 1953   6 Sheets-Sheet 5

INVENTORS
WILLIAM E. DAVIS
ALTON SCOTT
OLIVER W. SCOTT
BY Norman S. Blodgett
ATTORNEY Aug. 23, 1955  W. E. DAVIS ET AL  2,715,968
TOBACCO HARVESTER Filed May 18, 1953  6 Sheets-Sheet 6

INVENTORS
WILLIAM E. DAVIS
ALTON SCOTT
OLIVER W. SCOTT

BY Norman S. Blodgett
ATTORNEY

United States Patent Office 2,715,968
Patented Aug. 23, 1955

2,715,968
TOBACCO HARVESTER

William E. Davis, Seven Springs, and Alton Scott and Oliver W. Scott, Southern Pines, N. C.; said Alton Scott and said Oliver W. Scott assignors to said William E. Davis Application May 18, 1953, Serial No. 355,791

23 Claims. (Cl. 214—5.5)

This invention relates to a tobacco harvester and more particularly to an apparatus for facilitating the picking of tobacco leaves and their preparation previous to drying.

In the harvesting of tobacco it is necessary to pick the leaves from the standing tobacco plant, tie them in bundles of three to five leaves, and drape twenty to thirty bundles over a long stick which eventually will be used to hang the leaves in the drying barn. In the past this has been done by using a large number of workers each of whom walks between two rows of tobacco, picking the ripe leaves with one hand and placing them under his other arm. When the worker has accumulated an armful of leaves, he must carry them to a tobacco truck which may be situated several rows away. When the truck is full it is moved to another area where workers tie the stems of several leaves together and drape the resulting bundle over the drying stick. The disadvantage of this method, of course, is that the leaves are thrown together in a pile and handled many times, resulting in the deterioration of the leaves. Furthermore, such a method is very slow. Since the picking of the leaf and the tying are necessarily work that involves a certain amount of hard labor, many machines have been evolved in the past which have attempted to make this work easier, faster, and more efficient. However, these prior mechanisms have not been altogether successful. The present invention, however, obviates the difficulties experienced in the past in a novel manner.

It is therefore an outstanding object of the invention to provide an apparatus for facilitating tobacco operations prior to the drying.

It is another object of the present invention to provide a mobile apparatus which may be moved between the rows of tobacco plants for preparing tobacco for the drying operation.

It is a further object of the invention to provide an apparatus which can be moved between rows of tobacco plants for carrying the tobacco leaf pickers and facilitating their work of picking, bundling, and mounting the tobacco leaves on a drying stick.

It is a still further object of the instant invention to provide an apparatus for tying tobacco leaves in bundles and mounting the bundles on an elongated stick.

Another object of the invention is the provision of a mechanism for tying a plurality of tobacco leaves together at their stalks.

With these, and other objects, in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

Fig. 2 is a side, elevational view of the apparatus of the invention with the operators omitted;

Fig. 3 is a perspective view of a major component of the apparatus of the invention;

Like reference characters denote like parts in the several figures of the drawings.

Figure 1:
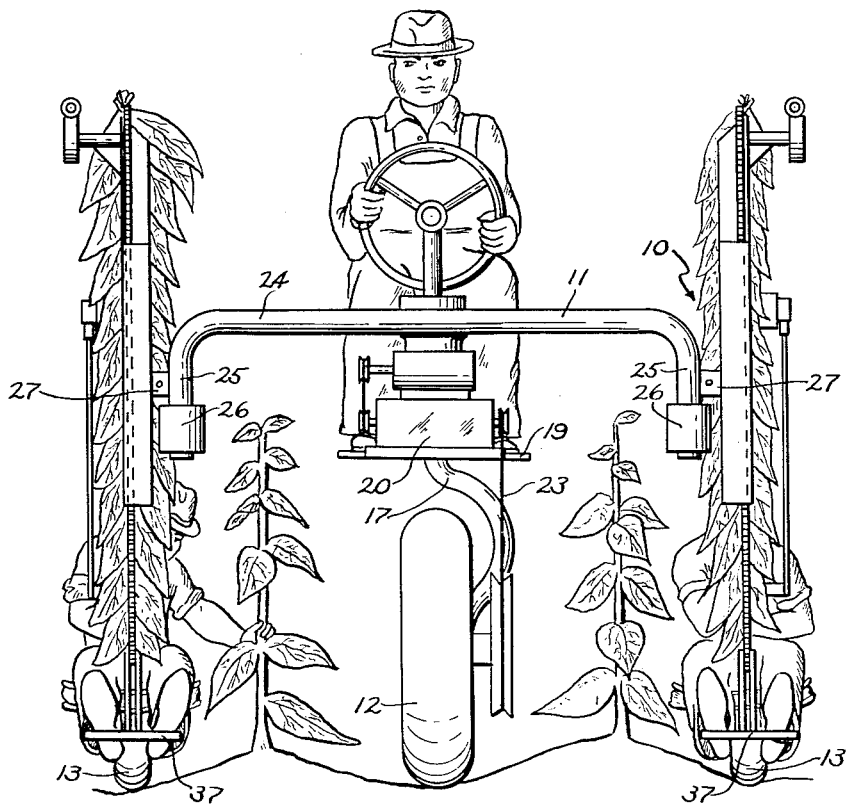
Fig. 1 is a head-on, elevational view of the apparatus of the invention with parts omitted showing the operators in their places.
Figure 1A:
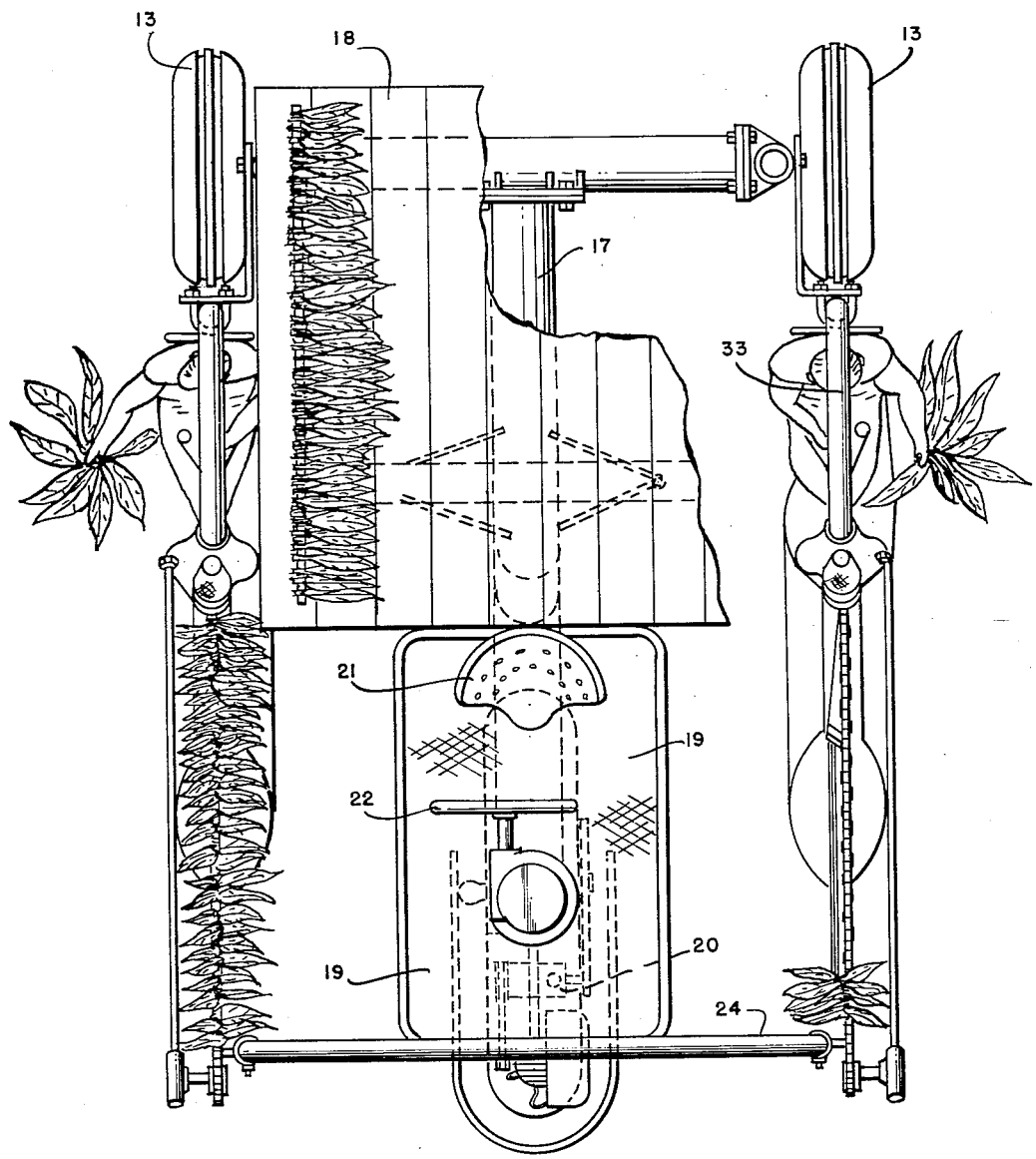
Figure 1A is a plan view of one form of the invention.

Referring first to Figs. 1 and 2, wherein are shown the general aspects of the invention, the apparatus of the invention indicated generally by the reference character 10 is shown having as its major component a tricycle tractor 11. This tractor comprises a large wheel 12 mounted centrally of the forward portion and two small wheels 13 at the rear. These small wheels 13 are each mounted on a vertical tubular member 14, the tubular members being jointed in their upper portions by cross members 15. Tubular longitudinal members 16 extend forwardly from the junctions of the vertical members 14 and the cross member 15, in a horizontal plane and more or less parallel to one another. Intermediate of the length of the tractor these members 16 are bent downwardly at 17 and they are also bent inwardly and joined together above the wheel 12. A vertical wheel mount 17 extends downwardly from this junction to the wheel 12 and the wheel 12 is rotatably mounted on its lower end. Between the members 16 on their rearward horizontal portions is mounted a platform 18 extending from side to side of the tractor. Some of the rear members of the tractor are not shown in Fig. 1 for purposes of clarity of presentation. Also mounted between the members 16 at their forward portion is a platform 19 on which an engine 20 is mounted. In this same area if desired may be mounted a driver's seat 21 and a steering wheel 22 operatively connected to the wheel 12 which in turn is driven by the engine 20 thru a conventional driving means 23.

A tubular bar 24 extends transversely across the forward portion of the tractor, ahead of the engine 20, and is removably secured to the tractor in its central portion. At the ends it is bent downwardly to form vertical portions 25 which are fitted at their lower ends into sockets 26 which are integral with tubular side members 27. The position of the vertical portion 25 and the socket 26 is adjustable vertically by means of set screws 28. Each of the side members 27 is composed of a forward horizontal portion 29 to the front end of which is attached the socket 26. At the rearward end of the portion 29 is mounted a side member which consists of a rearwardly inclined portion 30, the rearward end of which merges adjacent the center point of the tractor with a rearward horizontal portion 31. The rearward end of the portion 31 merges into a vertical portion 32 at the top of which the side member is forwardly bent to form an inclined portion 33. The upper portion of the vertical portion 32 of the side member 27 is connected to the upper portion of its respective tubular member 14 by a massive plate 34. Each side member 27 is provided at the rearward portion of the horizontal portion 31 with a seat 35 for the tobacco picker and the lower part of the vertical portion 32 is provided with a back rest 36 furnishing him with a back support. A foot rest 37 is provided on each side member for the feet of the leaf picker.

On each of the side members 27 is mounted a leaf bundling and mounting mechanism 38. This mechanism is attached to the side member by means of straps 39, 40 and a connection with the inclined portion 33. Fig. 2 shows the general arrangement of the mechanism on the tractor and also shows the leaves in their operative arrangement. This view shows some of the portions of the mechanism including a tying mechanism 41, a supply of string 42, and a supply of stick 43.

Referring next to Fig. 3, which shows many features of the mechanism 38, it can be seen that the mechanism is composed of a frame 44 formed of angles and flats welded together to form a generally rectangular configuration. At the forward portion of the mechanism is the aforementioned supply of sticks 43, these sticks being arranged longitudinally in a chamber provided by the components of the apparatus, the chamber being open at the top. A supply of sticks 43 is suspended in the chamber and maintained in the topmost portion thereof by means of straps 45 having detented buckles 46 which permit the adjustment of loops in which the sticks lie. Mounted about the periphery of the frame 44 are a number of sprockets 47, 48, and 49, the latter sprocket being shown only in Fig. 2. Around these sprockets is arranged a link belt 50 of the usual type having elongated pins 51 extending therefrom at intervals. At the rearward portion of the mechanism 38 and firmly attached to the inclined portion 33 of the side member is a timing mechanism 41. The timing mechanism is made up generally of a transverse housing portion 52 and two longitudinal housings 53 and 54, the housing 53 residing on the inner side of the link belt 50 and the housing 54 resides on the outer side of the said link belt. The housing portion 52 is the part of the timing mechanism which is directly attached to the portion 33 of the side member and the housings 53 and 54 are attached at their respective ends to the housing portion 52 and are dependent therefrom. A suitable source of power such as an electric motor 55 is mounted centrally of the housing portion 52 and serves as a motive source for the mechanism 38. A bevel gear 56 extending from the inner end of the housing portion 52 engages a similar bevel gear 57 which is keyed to one end of a drive shaft 58. The other end of the drive shaft 58 has keyed thereto a worm 59 which engages and drives a spur gear 60, which drives the sprocket 47 thru a stub shaft 61. The driving of the sprocket 47 is the sole means of moving the link belt 50. The other sprockets 48, 49 and 62 are idler sprockets. Mounted on the frame of the mechanism 38 rearwardly of the supply of sticks 43 is an alarm mechanism 63 including a bell 64, a switch 65 operatively connected to the bell and a trigger mechanism 66 which extends downwardly on either side of the belt 50 and is arranged to trip the switch 65 when engaged by a pin 51. The elements of the alarm mechanism may also be seen in Fig. 2. Extending downwardly from the longitudinal housing 54 is a shaft 67, the lower end of which is rotatively mounted in a trunnion 68, which is firmly secured to the side member 27. The shaft 67 extends thru the trunnion 68 and on its lower end is mounted a cam 69 having 3 cusps, two of which include an angle of substantially less than 90 deg. and they are in the shape of hooks, and the other of which is a pointed cusp having an included angle of about 90 deg. and more or less straight sides. The cusps on the cam 69 engage a hardened pin 70 extending vertically from a spring member 71, the intermediate portion of which is held and supported in a collar 72, which is secured to and dependent from a portion of the frame of the mechanism 38. The end of the spring member 71 away from the pin 70 is clamped between the ends of a harness member 73, which is formed of a heavy band of metal in the shape of a rectangle. The harness member surrounds the intermediate portion of the link belt 50 and is pivotally mounted on the frame of the mechanism 38 to rotate about a horizontal axis intermediate of its upper and lower portions, a pivot pin 74 being provided for this purpose journaled in a portion of the framework, as is evident in Figure 2. The upper portion of the harness member 73 is attached by means of a connecting rod 75 to a pin 76 which extends above the surface of the housing portion 52 and partakes of an eccentric motion about a vertical axis as will be explained more fully hereinafter. Connected to the shaft 67 is a shield 77 which is more or less coextensive therewith and moves with the shaft 67.

Figure 4:
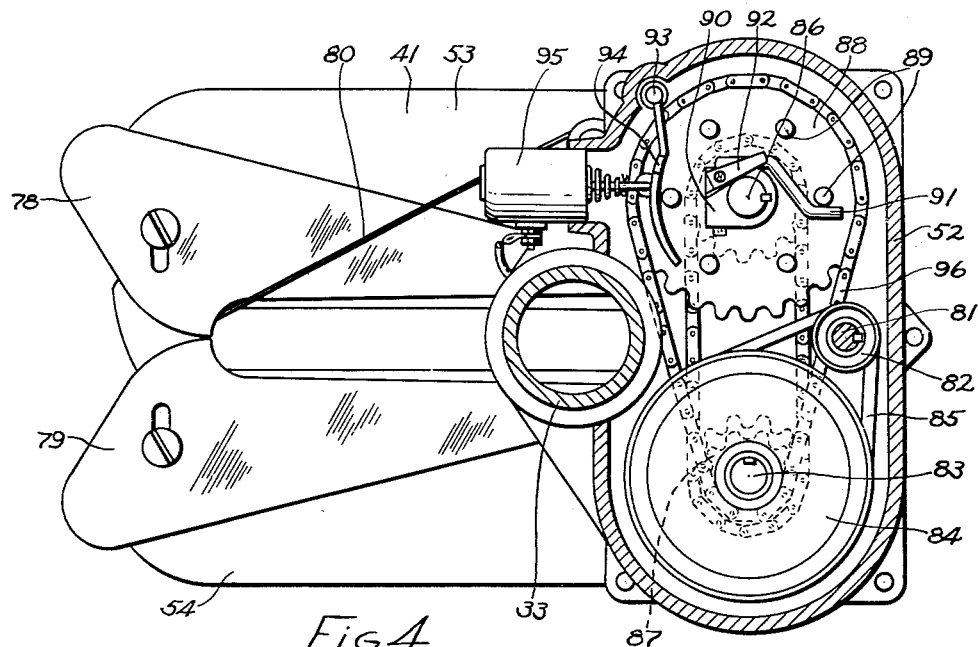
Fig. 4 is a top view of an important portion of the invention with portions broken away for clarity.
Figure 5:
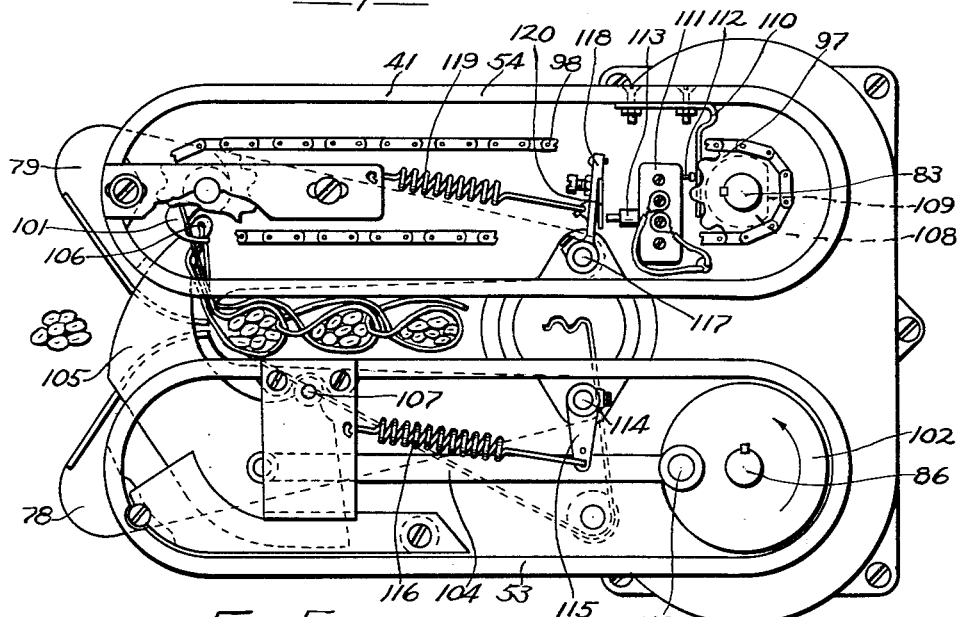
Fig. 5 is a bottom view of the mechanism shown in Fig. 4 taken on a plane immediately below the mechanism.
Figure 6:
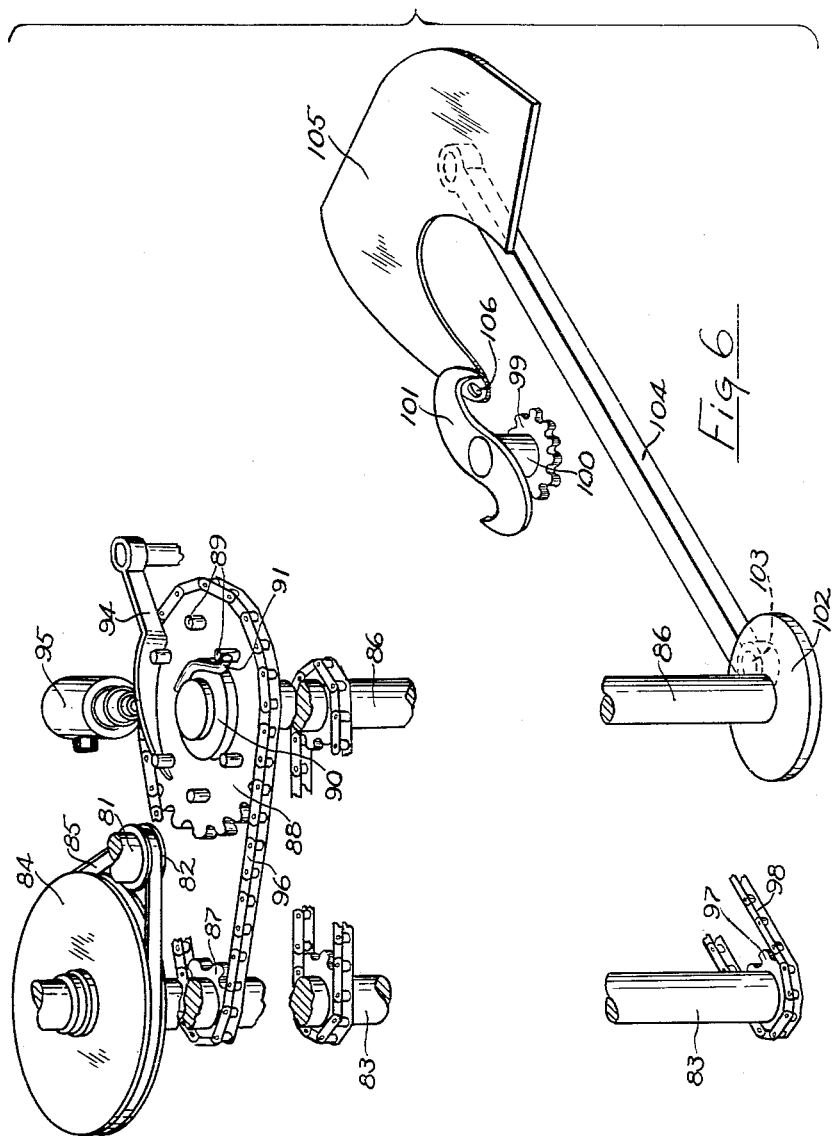
Fig. 6 is an exploded view of some of the major components of the apparatus shown in Fig. 4.

Figs. 4, 5 and 6 show in detail the construction of the timing mechanism 41. In particular Fig. 4, which is a plan view of the mechanism, shows the arrangement of the housing portion 52 and the underlying longitudinal housings 53 and 54. It can be seen that curved guide members 78 and 79 are mounted at the upper portions of the housings 53 and 54 respectively and are limited in their movement by slot and screw means. A strand 80 of string originating in the supply 42 can be seen in Figure 4 entering the mechanism between the guide members 78 and 79. The shaft 81 of the motor 55 is mounted in the housing portion 52 and has keyed thereto a pulley 82. A shaft 83 is mounted vertically in the outboard end of the housing portion 52 and the forward end of the longitudinal housing 54. A sprocket 87 fastened to the underside of the pulley 84 drives a sprocket 88 journaled on the shaft 86. Since the sprockets 88 and 87 and the pulley 84 are journaled on their respective shafts the motor 55 and its drive shaft 81 drive the pulley 84 and the sprocket 88 thru the belt 84 without moving the shafts 83 and 86. Sprocket 88 is provided with a series of pins or lugs extending upwardly from its upper surface and grouped concentrically about the shaft 86. A collar 90 is keyed to the shaft 86 and on this collar is secured a finger 91 which extends outwardly a sufficient distance to be engaged by the pins 89. This finger 91 is capable of having its outer end raised above the tops of the pins 89, but which is normally maintained in a lower position where it can be engaged by the pins 89 by a spring 92. On a vertical pin 93 is pivotly mounted a cam finger 94 whose outer end is curved to conform to the circle of pins 89. This finger 94 normally remains outside the circle of pins 89 and is movable toward and away from that circle. The finger 94 is connected to and movable by means of a solenoid 95. The upper edge of the curved portion of the finger 94, which may best be seen in Fig. 6, slopes upwardly from the outer end so that the outer end of the finger 91 in moving with the pins 89 will ride along this upper surface and be raised above the tops of the pins. However, the length of the finger 91 is such that it will cam along the curved surface of the finger 94 only when that finger is adjacent the circle of pins 89. When the finger 94 is moved by the solenoid 95 to a position away from the circle of pins 89 the pin 91 lies beneath the level of the tops of the pins 89 and will be carried around with the movement of the sprocket 88.

Referring next to Fig. 5, which shows the underside of the tying or looping mechanism 41, it should be remembered now that the shafts 83 and 86 and the longitudinal housings 53 and 54 have reversed places in the illustration when compared with the illustration shown in Fig. 4. A sprocket 97 is keyed to the bottom end of the shaft 83 and drives a sprocket chain 98. The sprocket chain in turn drives a sprocket 99 which is keyed to the lower end of a vertical stub shaft 100, which is mounted in bearings at the rearward end of the longitudinal housing 54. Keyed or otherwise fastened to the upper end of the shaft 100 is a bobbin 101 which is an S-shaped element with the ends tapered to points. On the lower end of the shaft 86 is mounted a wheel 102 having a pin 103 mounted at its periphery and extending downwardly therefrom. Pivotly mounted on this pin 103 is a connecting rod 104. The outer end is connected to a needle 105. The needle is a member formed of flat material and is somewhat curved in shape in the form of a semi-crescent. In other words, it is narrow at one end and rather large at the other end. At the narrow or pointed end the needle is provided with an aperture 106 and it is pivoted at the other end to a vertical pin 107 for swinging in a horizontal plane. The connecting rod 104 is connected to the needle 105 at the large end, some distance from the pivot pin 107.

A hub 108 extending upwardly from the upper surface of the sprocket 97 is substantially cylindrical but has one flat side 109. A flat spring 110 is bolted to the housing 54 and has one free end resiliently pressed against the hub 108 at all times. A switch 111 having an actuating finger 112 is fastened to the housing 54 adjacent the sprocket 97 with the actuating finger 112 resiliently biased against the spring 110. The switch 111, the spring 110 and the hub 108 are so arranged that when the spring 110 contacts the cylindrical portion of the hub 108 the switch is closed, but when the spring 110 rests against the flat side 109 of the hub 108, the switch will be open. The switch 111 is also provided with another spring biased actuating finger 113 which extends in the opposite direction from the actuating finger 112 for a purpose to be explained. The guide member 78 is keyed at its forward end to a stub shaft 114, about the axis of which it is permitted to rotate inwardly and outwardly. The lower end of the shaft 114 has attached thereto a crank arm 115, the outer end of which is attached to a spring 116. The other end of the spring 116 is attached to the housing 53, so that the guide member 78 is biased inwardly at all times by the spring 116. The guide member 79 is pivoted in a similar manner on a stub shaft 117 having a crank arm 118 which is connected to a spring 119 fastened to the frame 54 so that the guide member 79 is biased to an inward position. However, the crank arm 118 is provided with a contactor 120 whose position relative to the crank arm 118 is adjustable by screw means. The contactor is adapted to press against the actuating finger 113 when the guide member is in its outer position to open the switch 111. The switch 111 is connected in series with the coil of the solenoid 95 and serves to determine whether the arm 94 is in an inner or outer position relative to the circle of pins 89. The solenoid 95 is connected to an electric battery, not shown, and, when the switch 111 is closed, current passes thru the solenoid 95 and moves the arm 94 to an outer position. Of course when the switch 111 is open the finger 94 is biased to a position adjacent to pins 89.

The operation of the apparatus of the invention will now be understood in view of the above description. The driver may sit in the seat 21 where it is provided and steer the apparatus by means of the wheel 22 but where seat 21 is eliminated he stands on the platform and adjusts the steering wheel 22 from time to time. Because of the large front wheel drive with its independently movable unitary engine mounting a surprising small amount of the driver's time is required for steering, leaving him free to perform other operations such as adjusting or positioning hands of tobacco on the sticks, removing full sticks for racking and the like as the machine removes along the rows. The tobacco leaf pickers sit in the seats 35 with their feet on the foot rests 37. The tobacco plants are planted in rows of such width that the large forward wheel 12 may pass between two rows and the small rear wheels 13 will pass on the outside of the two rows of plants from which the leaves are being picked. The vehicle is moved by the engine 20 driving the wheel 12 thru the driving means 23. It will be noted that the motor 20 and front wheel 12 are mounted as an independent unit at the front central part of the machine. In addition to advantages of cost, this construction provides stability of operation requiring relatively very little of the driver's time and attention and also permits turning the entire machine in a curve of very short radius. The front wheel drive construction permits the use of a lighter frame because the pulling action of the single large combined steering and driving motorized wheel unit eliminates any tendency of the machine to "walk" in loose soil as would occur if the drive is made through the rear wheels. Such rear wheel drives tend to push the machine forward one side at a time as each drive wheel finds an independent footing. This action not only warps the frame but also greatly shortens its life, making frequent repairs necessary unless the frame is made very rigid and therefore heavy. Such rigid frame construction can be expensive and the added weight is added load which may limit the efficiency of the machine or require a larger motor. Of perhaps far greater importance is that such constructions require almost constant attention in steering in loose soil conditions. The front wheel drive construction has the great value that it frees the driver as mentioned above to perform work which otherwise would require another man. The apparatus with which each of the leaf pickers is working in Figure 1 is independent of the similar apparatus with which the other leaf picker is working. As the picker accumulates a bundle of tobacco leaves of two to five, the number depending on how ripe the tobacco is, he then inserts the bundle or hand with stems uppermost between the guide member 78 and 79 and into the tying mechanism 41. The tying mechanism ties the stems of the bundle tightly together with string and the bundle rests on the link belt 50 with all of the leaves hanging down on one side and the next bundle hanging down on the other side. The bundle is moved along under the action of the link belt 50 as it moves forward and also because the string which ties the bundle together is still connected with the portion which was used to tie the preceding bundles together. These short connecting string portions permit the bundles of leaves to hang down and to move freely under the effect of gravity and the forces exerted by adjacent bundles to maintain a depending side-by-side position. The string is not pulled so tightly that it cuts into the stems, but is sufficiently tight to maintain the loops firmly in bundle holding position while allowing the bundles themselves to move freely. Although the tying cord is not resilient in the sense of a rubber band, it is resilient in the sense that it will stretch and yield sufficiently to permit the depending hands to swing more or less freely without cutting or breaking the stems. This yielding both permits ready straddling of the drying stick and minimizes damage to the leaf tobacco. The bundles of tobacco leaves move forwardly and upwardly until they reach the uppermost position where they are prevented from going any further by the frame of the mechanism 38. In this uppermost position the bundles straddle the supply of sticks 43. When a sufficient number of tobacco leaves have arrived at that position, which number as will be explained hereinafter, is dependent on the amount of movement of the chain 50, the bell 64 will ring, warning the driver of this fact. This is because the elongated pins 51 extending from the chain 50 are so spaced as to bring about this timing. The pins cause the switch 65 to close by means of the trigger mechanism 66 being engaged by pins 51 and the bell 64 rings. The driver then reaches over and cuts the string between the lowermost bundle of tobacco leaves which straddles the supply of sticks 43. He then lifts the topmost stick, carrying with it the tobacco leaves which straddle that stick, and he places or hangs the stick with its dependent leaves on the platform 18, or on a trailer pulled behind, where such sticks and leaves accumulate until a sufficient load is obtained to warrant their being carried to the drying barn or some similar station. Now, the motor 55 which is connected to the battery of the engine 20, operates continuously, but the apparatus is so arranged that the other operations which take place within the mechanism 38, keep in step with the speed of the leaf picker in accumulating bundles. As a matter of fact, the cycle of tying the bundle of leaves and moving it upwardly to its position above the supply of sticks 43, is set in motion by the picker when he introduces the bundle between the guide members 78 and 79. The shaft 81 of the motor 55 drives the pulley 84 thru the belt 85. Since the pulley 84 is journaled on the shaft 83, but not keyed thereto, the shaft 83 does not turn the pulley 84. The sprocket 87 however is directly connected to the pulley 84, although in Fig. 6 it is shown separated from the pulley 84 for purposes of clarity and therefore the sprocket 88 is continuously driven thru the sprocket chain 96. Since the sprocket 88 is continuously driven so long as the finger 91 is in a position below the level of the tops of the pins 89, it will be carried by the pins, thus driving the collar 90, which in turn drives the shaft 86. When the shaft 86 is driven it, in turn, drives the shaft 83 thru the sprockets and sprocket chain connecting the two, as is shown in Fig. 6. When the shaft 83 is driven it in turn drives the stub shaft 100 thru the medium of the sprockets 97 and 99 and the sprocket chain 98. The driving of the shaft 100 of course rotates the bobbin 101. The shaft 86, when driven, carries the pin on the wheel 102 in a circle about the axis of the shaft 86, carrying with it the connecting rod 104, which, as a result, has a reciprocatory action imparted thereto. This action moves the needle 105 about its axis pin 107, so that the narrow end of the needle having the aperture 106 is moved in a wide arc in a reciprocatory manner. It can be seen then that the bobbin 101 and the needle 105 are actuated only when the finger 91 is in contact with the pins 89. At certain times it is not desirable to have these members driven and this may be accomplished by actuating the solenoid 95 in such a manner that the finger 94 is in its inward position against the circle of pins 89 so that the finger 91 is lifted and does not contact the pins 89. The finger is carried around in a circle by the sprocket 88 and the pins 89; and, when the outer end of the pin 91 strikes the upper surface of the finger 94, it is carried upwardly above the pins 89. When the pin 91 clears the tops of the pins 89 it is no longer driven thereby and remains in that position resting on the upper surface of the finger 94 and is returned to its position below the tops of the pins 89, where it may be engaged and driven by a pin 89, only when the finger 94 is retracted and the pin is allowed to drop. When the leaf picker introduces the bundle of tobacco leaves between the members 78 and 79 they are forced outwardly about their pivots 114 and 117 against the resilient biasing action of their springs 116 and 119. When the guide member 79 is moved its crank arm 118 is moved toward the switch 111 so that its contactor 120 strikes the actuating finger 113 of the switch 111. This opens the switch 111, thus cutting off the current to the coil of the solenoid 95 and permitting the finger 94 to be biased away from the circle of pins 89. This permits the pin 91 to drop between the pins 89 so that the shaft 86 is driven and the bobbin and needle go thru their cycle. When the shaft 83 is rotated the hub 108 is also rotated so that the spring 110 follows the shape thereof and falls at least once during each rotation into the flat side 109. When the spring 110 falls into the flat side 109 the actuating finger 112 of the switch 111 is resiliently biased into an outward position so that the switch 111 is closed and the solenoid 95 is actuated so that the finger 94 is in an outward position where it does not lift the finger 91 away from engagement with a pin 89. The result of the foregoing is that while the leaf picker is accumulating a bundle of leaves the machinery is at rest, with the sprocket 88 rotating, but not driving the shaft 86 or the shaft 83. In this condition the pin 99 rests on the upper surface of the finger 94, which is in its inward position adjacent the circle of pins 89. When the picker introduces the bundle of leaves between members 78 and 79, the solenoid is actuated so that the finger 94 moves away from the pins 89 and the pin 91 drops between the pins 89, and comes into contact therewith, so that the shafts 86 and 83 are driven. The tying cycle of the bobbin and needle is also begun. However, when the shaft 83 has been rotated thru almost a complete rotation thus producing a complete rotation of the needle and bobbin, the flat side 109 comes in contact with the spring 110, so that by means of switch 119 the solenoid is deactivated and the finger 94 returns to its position adjacent the pin circle. Pin 91 is then disconnected from pins 89 and the needle and bobbin again come to rest. During the cycle thus described, two other things are happening. First, the chain 51 is being driven and secondly, the shield 77 is moved. During the single rotation of the shaft 86 the pinion 56 is rotated, thus rotating the pinion 57, the drive shaft 58, the worm 59, the spur 60, and the stub shaft 61, and the sprocket 47. The driving of the sprocket 47 of course moves the link belt 50 a short distance. The single rotation of the shaft 83, which takes place during a cycle, also moves the pin 76 thru a single cycle. This means that the connecting rod 75 goes thru one reciprocation moving the harness member 73 about its pivot pin 74. The movement of the lower portion of the harness member 73 thru one back and forth motion causes the spring 71 to pivot about its collar 72. The free end bearing the pin 70 partaking of a motion longitudinally of the apparatus and engaging a cusp of the cam 69 and drawing it rearwardly. This rotates the shaft 67 and moves the shield 77 from a position where it covers the bobbin and needle mechanism to a position where it does not cover this mechanism and then returns it again to its initial position. That is to say, the leaf picker in moving the bundle of leaves between members 78 and 79 starts a cycle of the shield 77, whereby the shield is moved away so that the bundle can enter the mechanism and then it is returned so that the leaf picker cannot insert his hands or other parts of his body into the mechanism. At the beginning of a cycle the shield 77 is again covering the mechanism and the outer cusp of the cam 69 is in the forward position and the pin 70 and its spring member 71 are in a rearward position. When the cycle is begun the member 79 is drawn forwardly pulling the outer cusp forwardly, rotating the shield away from the mechanism. As the cycle continues, the pin 70 engages the other inside cusp of the cam and drives it forwardly, thus returning the shield 77 to its position covering the mechanism.

As is evident from the relative sizes of the sprocket wheels, the shafts 83, 86 and 100 rotate at the same rate. This means that the bobbin 101 rotates once for every in and out cycle of the needle 105. The manner in which the bundles of tobacco leaves are tied together can be seen best in Fig. 5. An individual bundle of leaves enters the apparatus while the needle 103 is in its retracted position away from the bobbin 101. When the bundle is well into the apparatus the single cycle of needle and bobbin rotation has started. The needle proceeds across the back of the bundle of stems and carries with it a loop of string. This loop is engaged by the next horn of the bobbin 101 to come along. Once the loop has been engaged by the horn of the bobbin 101 the needle 105 moves to its retracted position again, sliding along the string and leaving a loop behind. The loop is held by the horn of the bobbin and then the bobbin begins to move that loop to a position on the other side of the bobbin. This tightens up all loops and knots that have gone before in previous cycles. The bobbin holds the loop in this far position until the next bundle of leaves enters. At that time the needle 105 again proceeds across the back of the bundle of leaves, carrying another loop along. This loop is passed thru the first-formed loop and picked up by the other horn of the bobbin. The bobbin meanwhile releases the first-formed loop as it rotates. It can be seen then that when the horn of the bobbin picks up the second loop and carries it to its far position the result is that the first loop is tightened up and in that way the bundles of leaves are held together by a series of loops, one looped within the other, and drawn tight. As is evident in the picture, any loose ends of string are held tightly, due to the fact that all the loops are drawn up tight by the bobbin.

It is obvious that many changes may be made in the form and construction of the invention without departing from the spirit thereof. While there has been presented above a particular embodiment of the invention, many variations will readily suggest themselves in the light of the above disclosure to those skilled in the art. All these different forms which fall within the spirit of the invention are intended to be covered by the appended claims wherein generic terms are employed for the express purpose of including the many equivalent structures by which the present results or any desired part of them can be obtained.

Although the combination of the low seating arrangement on each side with the primers adjacent the tobacco plants, the raised platform carrying both stacked tobacco sticks and sticks loaded with hands of tobacco, and the looper mechanism with the associated and controlled upwardly moving conveyor chains carrying looped hands of tobacco from the primers up to the raised platform mounted on wheels straddling the tobacco rows and high enough to clear the tobacco plants over which it passes together with the large motorized central unitary front wheel drive comprise a preferred form of the invention, novel and useful combinations can be made according to the invention which do not include all of the above elements or sub-combinations. For example, if a less expensive harvester is desired the looping mechanism with its automatic control can be eliminated as a sub-combination and a less fully automatic form of the invention provided.

Having best described our invention, what we claim is new and desire to secure by Letters Patent is:

1. An apparatus adapted to be moved along a row of tobacco plants for the harvesting of the leaves thereof comprising: An engine for driving the apparatus, a mechanism for tying the leaves in bundles, a mechanism for moving the bundles upward to a position straddling a drying stick carried by said apparatus adjacent a raised platform constructed and arranged for temporarily storing a plurality of drying sticks carrying bundles of leaves and a leaf picker's seat mounted on said apparatus below said platform.

2. An apparatus adapted to be moved along rows of tobacco plants for the harvesting of the leaves thereof comprising: Wheels spaced to travel between rows, an engine for driving the apparatus, a mechanism for binding the stems of a plurality of leaves to form a bundle, a mechanism for moving the bundles upwardly for easy access for placing in a position straddling a drying stick, a supply of drying sticks supported by the apparatus adjacent the upward position to which said bundles are moved and a raised platform positioned high enough to clear the majority of the plants in said rows and spanning a plurality of said rows and constructed and arranged for temporarily receiving and storing the sticks and leaves and a leaf picker's seat mounted on said apparatus below said platform.

3. An apparatus adapted to be moved along rows of tobacco plants for the harvesting of the leaves thereof comprising: Wheels spaced to travel between rows, an engine for driving the apparatus, a station for a driver located in a forward upper position in the apparatus, a seat for a leaf picker located in a lower rearward position in the apparatus, a mechanism located adjacent the feet of the leaf picker for binding the stems of a plurality of leaves to form a bundle, a mechanism for moving the bundles from the tying mechanism to positions adjacent the driver's station straddling a drying stick, and a platform above said seat for temporarily storing the sticks and leaves.

4. Apparatus for harvesting tobacco leaves, comprising: A tractor device having a raised platform and a centrally positioned rotatable driving and steering motorized single wheel unit, a leaf picker's seat carried by said device in a low position relatively close to the base of tobacco plants to be harvested, a mechanism for binding the stems of the leaves to form a bundle, a mechanism for moving the bundles upwardly from a position within easy reach of said seat to a position overlying and straddling a drying stick, and means coordinated with the movement of said bundles for indicating the accumulation of a pre-selected number of bundles on the stick.

5. The combination set forth in claim 4, said first mechanism comprising a looping device having a needle member and loop forming element operable to chain stitch string for permanently binding the stems of the leaves to form a bundle, an endless belt mechanism positioned to receive looped string-connected bundles from said looping device and controlled by said looper device for moving the bundles to said position overlying and straddling said drying stick.

6. Apparatus for harvesting tobacco leaves, comprising: A mechanism for permanently binding the stems of the leaves to form a bundle, an endless belt mechanism for moving the bundles to a position overlying and straddling a supply of drying sticks, a guard mechanism, and connections between the mechanism such that the introduction of a plurality of leaves into the apparatus starts the cycle of the binding mechanism, initiates a movement of the endless belt mechanism, and causes the guard mechanism to uncover the binding mechanism for a short time.

7. A harvester comprising a frame, a forward centrally-located wheel supporting said frame, two rearward outwardly-located wheels supporting said frame, a motor overlying said forward wheel, means connecting the motor to the forward wheel for the driving thereof, means connected to the forward wheel for the steering thereof, a raised platform secured to said frame, a conveyor means carried by the frame and passing from a position adjacent the level of the wheels to a position above the platform, said conveyor means having tobacco leaf bundle holding means associated therewith and carried thereby and operable to hold bundles of leaves of tobacco in depending position on said conveyor means for transfer as bundles from said position adjacent the level of the wheels to said position above the platform, means for driving the chain, and a seat fastened to the frame below said platform whereby a leaf picker seated thereon may pick ripe leaves and place bundles of said leaves in dependent position on said conveyor means.

8. In a tobacco harvester, a frame mounted on spaced wheels constructed to move along rows of tobacco plants for harvesting the leaves therefrom, a raised platform carried by said frame high enough above the ground to clear most tobacco plants, a plurality of seats for leaf pickers located on a lower part of said frame below said platform, a plurality of tobacco leaf holding and binding means each having movable arms having a binding string associated therewith for holding a plurality of leaves to form a bundle, a mechanism for moving bundles of leaves from a position within reach of at least one of said seats to a raised position adjacent said platform.

9. The combination set forth in claim 8, spring means urging said movable arms toward each other in resilient leaf holding position.

10. The combination set forth in claim 9, said mechanism for moving said bundles comprising a plurality of movable chains and sprockets therefor mounted on said frame, said movable arms acting to grasp said bundles and to position said bundles individually on said chains for bodily movement thereby from one said position to another and drive means for said chains.

11. The combination set forth in claim 10, a bundle of tobacco sticks on said platform adjacent said second position, said platform and said frame providing temporary storing means for sticks loaded with bundles of said leaves.

12. The combination set forth in claim 11, a drive unit comprising a single wheel pivotally mounted on the forward portion of the longitudinal axis of said harvester and a motor connected in driving relation to said single wheel and movable therewith as a unit.

13. The combination set forth in claim 12, a plurality of looper devices each comprising one of said holding means together with a needle element and a loop forming element operable to chain stitch string around the stems of a bundle held by said movable arms, said mechanism comprising an endless chain belt positioned to receive looped string connected bundles from said looping device and to support said bundles by the looping string for movement from said first position to said second position for straddling one of said drying sticks.

14. The combination set forth in claim 13, and means to position alternate bundles on alternate sides of said endless chain belt.

15. A tobacco harvester comprising a frame, wheels supporting said frame, upwardly extending conveyor chains carried by said frame, drive means for actuating said chains, a raised platform secured to the top portion of said frame high enough to clear tobacco plants without breaking the stalks thereof, said chains extending upwardly above said platform from therebelow, said chains comprising links for carrying bundled hands of tobacco leaves, a plurality of seats for leaf pickers located on the lower part of said frame, means adjustably suspending said seats from said frame in back of said chains, a supply of tobacco sticks carried by said frame closely adjacent each said chain and positioned beneath its respective chain to receive draped bundled hands of tobacco therefrom, each said conveyor chain being operable to convey bundles of tobacco leaves from a point within easy reach of at least one of said seats to a position overlying a stick of said supply of sticks and tying cord looping means carried by said frame and positioned forward of and adjacent said seats for tying bundled hands of tobacco leaves in depending position on said chains.

16. An apparatus adapted to move along a row of tobacco plants for harvesting the leaves therefrom comprising, an engine for driving the apparatus along a row to be harvested, a frame, a raised platform mounted on said frame for receiving and temporarily storing tobacco leaves, a movable mechanism for moving bundles of leaves from a position below said platform to a position above said platform and means carried by said movable mechanism for holding bundles of leaves by their stems in draped depending position on said movable mechanism, said bundle holding means permitting movement of said bundles with respect to said movable mechanism under the action of gravity whereby damage to harvested leaves and breaking of the stems thereof are minimized and the bundles are suitably positioned with freedom of movement for the next handling step.

17. The combination set forth in claim 16, a supply of tobacco sticks carried by said apparatus within convenient reach of said raised position adjacent said platform.

18. The combination set forth in claim 17, said movable mechanism comprising a chain, means to drive said chain, a tobacco stick positioned adjacent an upper part of said chain whereby said chain moves said depending bundles to a position straddling said drying stick, said bundle holding means comprising a tying cord looped around the stems of the depending bundles in bundle holding relation thereto and having portions of said cord carried by said chain with the looped bundles hanging down substantially alternately on opposite sides of said chain.

19. The combination set forth in claim 17, said movable mechanism comprising a conveyor chain having a portion thereof positioned at an angle to the horizontal and said bundles of leaves carried thereon being free to move under the action of gravity to maintain a substantially vertical position with respect to the horizontal during said movement from said position below said platform to said position above said platform.

20. The combination set forth in claim 17, said means carried by said movable mechanism comprising a binding cord, a looper device carried by said frame comprising a needle element, a loop forming element and spring pressed arms mounted for relative movement to and from tobacco hand holding position, cooperating to chain stitch cord around the stems of a bundled hand of tobacco leaves held by said arms with short connecting portions of cord between stitched bundles, said movable mechanism comprising a continuous closed movable element across which said short connecting portions of cord are positioned.

21. An apparatus adapted to move along a row of leaved plants for harvesting the leaves therefrom comprising, an engine for driving the apparatus along a row to be harvested, a frame, a leaf pickers seat carried by said frame adjacent the ground, a raised platform mounted on said frame for receiving and temporarily storing tobacco leaves, a movable mechanism for moving bundles of leaves from a position adjacent said seat to a position above said platform and means carried by said movable mechanism for holding bundles of leaves by their stems in draped depending position on said movable mechanism, said bundle holding means permitting movement of said bundles with respect to said movable mechanism under the action of gravity whereby damage to harvested leaves and breaking of the stems thereof are minimized and the bundles are suitably positioned with freedom of movement for the next handling step.

22. The combination set forth in claim 21, a front wheel drive for said apparatus comprising said engine and a large driving wheel connected to said frame and rotatable as a unit with respect thereto.

23. The combination set forth in claim 21, said movable mechanism comprising a movable chain mounted on a plurality of wheels carried by said frame and means to drive said chain, said holding means comprising tying cord, said movable chain being so constructed that it will releasably engage said cord and carry draped depending bundles of tobacco leaves between said positions.

References Cited in the file of this patent

UNITED STATES PATENTS

| Number | Name | Date |
|---|---|---|
| 551,870 | Miller | Dec. 24, 1895 |
| 1,275,781 | Stark et al. | Aug. 13, 1918 |
| 1,306,374 | Gilbert | June 10, 1919 |
| 1,629,422 | Trulove | May 17, 1927 |
| 2,267,234 | Garber | Dec. 23, 1941 |
| 2,327,252 | Dickerson | Aug. 17, 1943 |
| 2,346,786 | Radeck | Apr. 18, 1944 |
| 2,477,068 | La Motte | July 26, 1949 |
| 2,518,965 | Whitley | Aug. 15, 1950 |
| 2,550,824 | Kohler | May 1, 1951 |
| 2,630,086 | Kindseth et al. | Mar. 3, 1953 |
| 2,652,932 | Funnell | Sept. 22, 1953 |